June 22, 1954    W. BOYD ET AL    2,681,837
BEARING OIL SEAL
Filed June 28, 1951    2 Sheets-Sheet 1

INVENTORS
W. BOYD
J.T. PURVIS
PER
Gareth E. Maybee

ATTORNEY

Patented June 22, 1954

2,681,837

UNITED STATES PATENT OFFICE 2,681,837

BEARING OIL SEAL

Winnett Boyd, Bobcaygeon, Ontario, and Joseph Thompson Purvis, Toronto, Ontario, Canada, assignors to A. V. Roe Canada Limited, Malton, Ontario, Canada, a corporation Application June 28, 1951, Serial No. 233,988

7 Claims. (Cl. 308—187)

This invention relates to bearings and particularly to sealing means provided to prevent leakage of lubricating oil from the bearings of shafts rotating at high speed.

The lubrication and cooling of a high speed bearing, such as those used in gas turbine engines, is clearly a matter of great importance and is usually effected by the circulation of oil through the bearing and the bearing housing. Because of the high speed of rotation of the shaft, the flow of oil must be considerable and a great deal of foaming takes place around the bearing. In consequence the retention of the oil in the circuit is a matter of some difficulty since the rubbing or contact type of seal between the bearing housing and the shaft is impracticable, and slinger rings and drain ways are liable to become choked with foam.

The object of this invention is to provide an improved form of bearing housing and sealing means between the said housing and the shaft, which will prevent the escape of oil from the circuit, thereby reducing oil consumption and ensuring cleanliness of the surrounding structure. Other objects and advantages will be apparent from the following description of a preferred application of the invention.

In the accompanying drawings forming a part of this application and in which like characters of reference are used to designate like parts throughout the several views.

Figure 1:
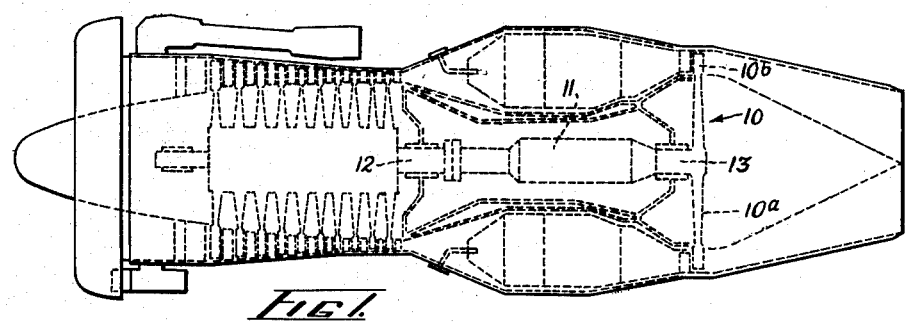
Fig. 1 is an elevation of a gas turbine engine showing in dotted lines various operating parts thereof, including main bearing assemblies embodying the invention.

The details of the gas turbine engine shown in Fig. 1 need not be discussed except to point out that the engine embodies a shaft assembly comprising a turbine rotor 10 having a rotor disc 10a and blading 10b mounted on shaft 11, the said shaft assembly being supported in bearing assemblies 12 and 13. In the example of the invention described herein the bearing assembly 13 is situated adjacent the rotor 10.

Figure 3:
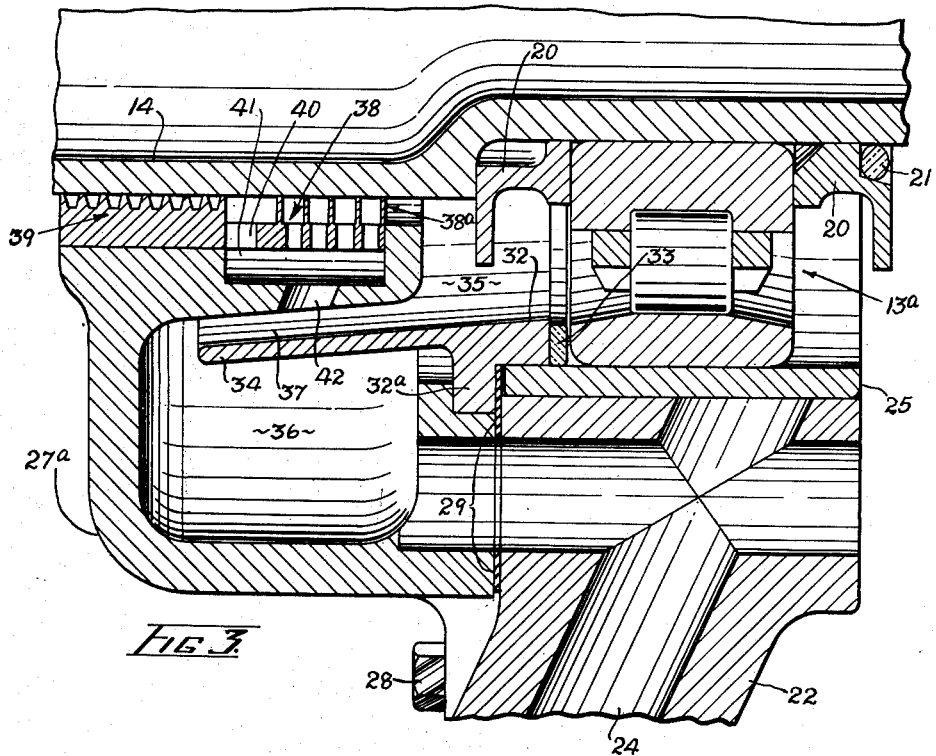
Fig. 3 is a fragmentary view on a still larger scale of the bearing assembly and seals shown in the lower portion of Fig. 2.
Figure 2:
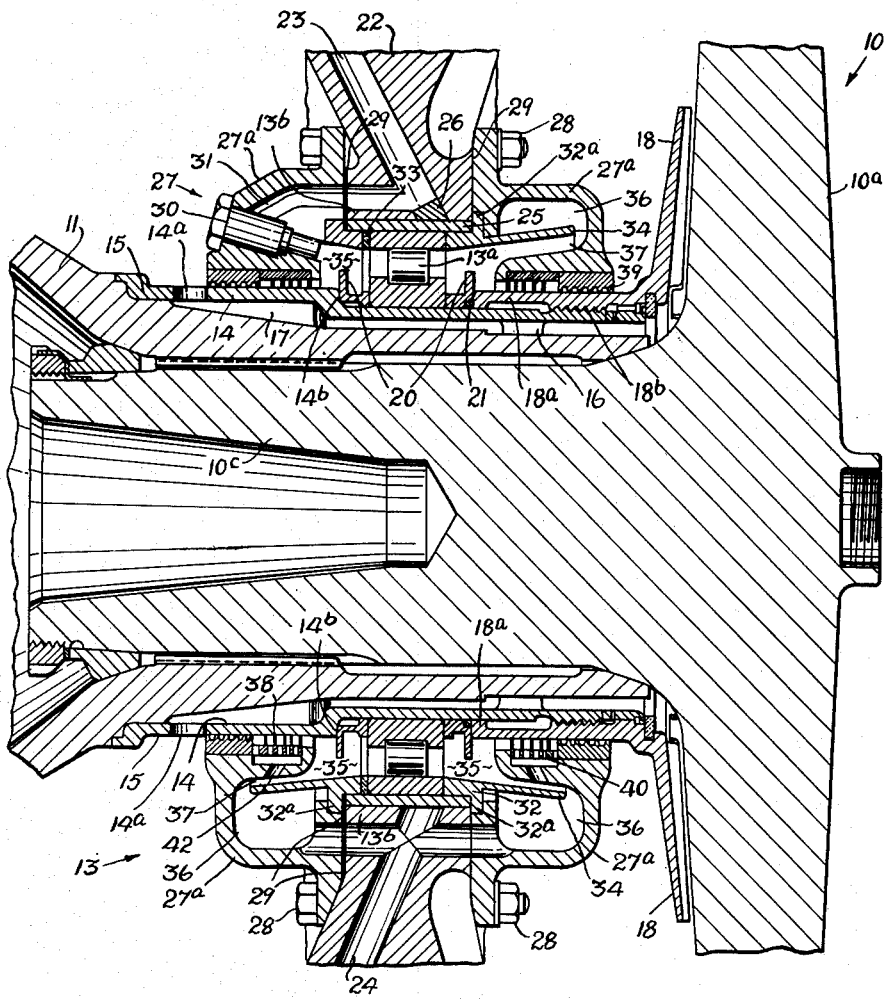
Fig. 2 is a section of one of the turbine bearing assemblies and seals on an enlarged scale.

It will be understood by those skilled in the art that the said rotor is subjected to wide temperature variations and, in operation, considerable heat is conducted through the rotor disc 10a from the blading 10b which functions in a stream of very high temperature gases. The construction is designed to meet these conditions. From Fig. 2 it will be seen that the rotor disc 10a is mounted by means of a stub 10c in the hollow end of the shaft 11. The shaft assembly includes a sleeve 14 surrounding the terminal portion of the shaft 11. The sleeve 14 is supported on the shaft proper at one end by a shoulder 15 and at the other by a group of annularly spaced piers 16, so that a space 17 is provided between the sleeve 14 and the main body of the shaft 11. As shown in Figs. 2 and 3, the shaft assembly is supported by a roller bearing 13a which is mounted on the sleeve 14. A plurality of annularly spaced apertures 14a is provided in sleeve 14 adjacent the shoulder 15 so that air may be circulated through the space 17 to insulate the said bearing from the shaft 11 which, as explained, may receive considerable heat from the rotor 10. The circulation of air is promoted by a centrifugal impeller 18 which is screwed externally onto the sleeve 14; the inner race of the bearing is located longitudinally on the sleeve between two slinger rings 20, the assembly of slinger rings and inner race being clamped between a shoulder 14b on the sleeve and the end of the cylindrical portion 18a of the impeller. An O-ring 21 is provided in a recess between the said cylindrical portion 18a and the slinger ring 20 adjacent thereto to prevent leakage of oil through the thread 18b whereby the impeller 18 is mounted on the sleeve.

The outer race of the bearing 13a is mounted in a sleeve 25 in a circular support 13b. The support 13b is held in the engine frame by a web 22 in which are provided an inlet oilway 23 and an outlet oilway 24. The oilway 23 is formed by drilling outwardly from the axis of the support and subsequently closing the end of the hole with a plug 26; this prevents oil under pressure from penetrating between the sleeve 25 and the bore of the support 13b in which it is accommodated. The bearing is enclosed, in spaced relationship, by two seal assemblies 27, one situated on each side of the support 13b and having casings 27a clamped to the support by annularly spaced nut and bolt assemblies 28; thin sealing washers 29, of paper or some similar material, are provided between the said casings and the support to ensure oil-tight joints. One of the said seal assemblies embodies an oil jet 30 which is connected by a passageway 31 to the inlet oilway 23 and is directed to discharge a flow of oil upon the bearing 13a. The support 13b, together with the seal assemblies 27, constitute a housing which encloses the bearing.

The outer race of the bearing is held between two rings 32 and these rings have outwardly extending flanges 32a which fit into corresponding recesses in the seal assembly casings 27a and are secured thereby to the support 13b.

To ensure that the outer race is held firmly against any tendency to rotate, and to accommodate any slight tolerances in the thickness of the washers 29 or elsewhere, a yieldable packing ring 33 is inserted between the outer race and one of the rings 32. (It will be understood that, because the bearing is of roller type, accurate longitudinal location of the inner and outer races relative to each other is unimportant and no provision need be made, e. g. by shimming, to establish such relationship between the races; it would vary in any case, due to differential thermal expansion between the shaft and the frame of the engine.)

An annular baffle 34 is fixed to each of the rings 32 on that side of the ring remote from the bearing and the support 13b, in effect, dividing the enclosure formed between the seal assembly and the bearing into two portions—an annular chamber 35 adjacent the bearing, and a sump 36 (see Fig. 3). Each baffle is of frusto-conical form and its smaller end is attached to the ring, its longer end being spaced from the wall of the seal assembly casing to form a restricted annular passage 37 into the sump. To give the jet 30 free access to the bearing, the adjacent baffle 34 is cut away locally in line with the jet, but otherwise the baffle completely surrounds the shaft.

Each annular baffle 34 is frusto-conical in longitudinal cross-section, that is to say it diverges from the ring 32 to which it is fixed. Thus the passage 37 diverges from the axis of the shaft whereby centrifugal force induced by the rotation of the shaft will cause oil to flow in the passage from the chamber 35 to the sump 36.

Each seal assembly 27 terminates with a seal at the surface of the cylindrical portion 18a of the impeller on the side of the bearing adjacent the turbine rotor, and at the surface of the sleeve 14 on the side of the bearing remote from the turbine. By reference to Figs. 2 and 3, it will be seen that each seal has two parts namely a labyrinth type seal 38 adjacent the bearing, and a two-start threaded gland 39 on the outside of the assembly remote from the bearing. The labyrinth type seal 38 comprises the usual series of axially spaced gland rings 38a extending from the casing of the assembly inwardly towards the rotating surface, but in this construction, drain holes 40 are provided at the lowest part of the seal between adjacent gland rings, the said drain holes leading to a drainage sump 41 in the casing which in turn drains into the passage 37 by way of a hole 42. It will be understood that the lubricating system described is intended to be applicable to a shaft operating in a substantially horizontal position, with the jet 30 situated in the upper part of the bearing assembly above the shaft. Although these conditions cannot be regarded as invariable, especially in the application of the invention to aircraft gas turbine engines, they are assumed to be the normal conditions of operation and departures therefrom are assumed to be of limited duration. Thus, for effective operation, the construction relies upon the gravitational forces acting on the oil under these prevailing conditions.

The threaded gland 39 comprises a coarse female thread, handed in accordance with the direction of rotation of the adjacent surface, so that as the shaft rotates the resulting aerodynamic drag or skin friction tends to carry air inwardly along the thread into the bearing assembly. The threads of the two glands 39 are, of course, oppositely-handed.

It should be noted that there is a certain degree of interaction between the two parts of the seal inasmuch as the threaded gland 39 provides a positive return for any oil which may escape past the labyrinth type seal 38, and that there would be no such positive action if the position of the two seals were interchanged. Moreover, by virtue of the pumping action of the gland 39 there will be an inward flow of air through the seal 38 which will assist the draining action of the oil through the holes 40 and 42.

When the engine is in operation, lubricating oil is discharged from the jet 30 on to the bearing 13a. This oil is collected in the chambers 35 from whence it flows, due partly to the action of the slinger rings 29 and partly to the centrifugal force on the oil, along the passageways 37 and into the sumps 36. Because of the high speed at which the shaft (and hence the bearing) is rotating, the oil in the chambers 35 experiences considerable foaming. By forcing the oil-air mixture through the narrow passageways 37 this foaming is considerably reduced, and a further reduction takes place in the sumps 36 which, since they are non-rotating, afford the mixture an opportunity to settle so that the entrained air can separate out. Once the oil has passed into the chambers 35, the conical form of the baffle 34 ensures that there will be no counter-flow back into the bearing.

The oil and the air are scavenged from the sumps 36 by a pump (not shown), leaving by way of the outlet oilway 24. This scavenge pump is necessarily of sufficient capacity to handle not only the return oil but also the air pumped into the bearing by the seals.

It is to be understood that the form of the invention herewith shown and described is to be taken as a preferred example of the same and that various changes may be made in the shape, size and arrangement of the parts.

What we claim as our invention is:

1. In a bearing for rotatably mounting a shaft assembly on a support, a casing extending from the support to the shaft assembly and defining with the support and shaft assembly an enclosure adjacent the bearing, a ring secured to said support and having an annular baffle projecting into said enclosure in a direction diverging from the axis of the shaft assembly and dividing the enclosure into an annular chamber adjacent the bearing and an annular sump; an inlet for admitting oil to the chamber; and a drain leading from the sump.

2. In a bearing for rotatably mounting a shaft assembly on a support, a casing extending from the support to the shaft assembly and defining with the support and shaft assembly an annular enclosure adjacent the bearing; sealing means between the shaft assembly and the casing at adjacent relatively rotatable surfaces; a ring secured to said support and having an annular baffle projecting into said enclosure and enclosing said sealing means thereby dividing the said enclosure into an annular chamber adjacent the bearing, a sump, and a restricted passage extending from the chamber between the baffle and the sealing means and opening into the sump; an inlet for admitting oil to the chamber, and a drain leading from the sump.

3. In a bearing for rotatably mounting a shaft assembly on a support, a casing extending from the support to the shaft assembly and defining with the support and shaft assembly an annular enclosure adjacent the bearing; a ring secured to said support and having an annular baffle projecting into said enclosure in a direction diverging from the axis of the shaft assembly and dividing the enclosure into an annular chamber adjacent the bearing and an annular sump; a seal between the shaft assembly and casing including helical rings disposed to provide a pumping action to carry air into the casing and prevent escape of lubricant therefrom; an inlet for admitting oil to the chamber; and a drain leading from the sump.

4. In a bearing for rotatably mounting a shaft assembly on a support, a casing extending from the support to the shaft assembly and defining with the support and shaft assembly an annular enclosure adjacent the bearing; a ring secured to said support and having an annular baffle projecting into said enclosure in a direction diverging from the axis of the shaft assembly and dividing the enclosure into an annular chamber adjacent the bearing and an annular sump; a labyrinth seal between the shaft assembly and casing including a series of axially spaced gland rings extending from the casing to the shaft assembly and drain holes between the glands for draining oil to the passage; an inlet for admitting oil to the chamber; and a drain leading from the sump.

5. In a bearing for rotatably mounting a shaft assembly on a support, a casing extending from the support to the shaft assembly and defining with the support and shaft assembly an annular enclosure adjacent the bearing; a ring secured to said support and having an annular baffle projecting into said enclosure in a direction diverging from the axis of the shaft assembly and dividing the enclosure into an annular chamber adjacent the bearing and an annular sump; a labyrinth seal between the shaft assembly and casing including a series of axially spaced gland rings extending from the casing to the shaft assembly and drain holes between the glands; a drainage sump and an outlet from the sump for draining oil to the passage; an inlet for admitting oil to the chamber, and a drain leading from the sump.

6. In a bearing for rotatably mounting a shaft assembly on a support, a casing extending from the support to the shaft assembly and defining with the support and shaft assembly an annular enclosure adjacent the bearing; a ring secured to said support and having an annular baffle projecting into said enclosure in a direction diverging from the axis of the shaft assembly and dividing the enclosure into an annular chamber adjacent the bearing and an annular sump, a seal between the shaft assembly and casing including a series of axially spaced gland rings and a helical groove, the rings and the groove being disposed in series so that the rings are between the groove and the bearing, an inlet for admitting oil to the chamber, and a drain leading from the sump.

7. In a bearing for rotatably mounting a shaft on a support, a casing extending from the support to the shaft assembly, and extending inwardly toward the bearing in liquid sealed relationship to the shaft assembly to define with the support and shaft an annular enclosure adjacent the bearing; a ring secured to said support and having an annular baffle projecting into said enclosure in a direction diverging from the axis of the bearing and dividing the enclosure into an annular chamber adjacent the bearing and an annular sump; an inlet for admitting oil to the chamber; and a drain leading from the sump.

References Cited in the file of this patent

UNITED STATES PATENTS

| Number | Name | Date |
|---|---|---|
| 2,423,973 | Halford | July 15, 1947 |
| 2,493,160 | Morley | Jan. 3, 1950 |
| 2,587,326 | Islip | Feb. 26, 1952 |